United States Patent [19]

Hinrichs et al.

[11] 3,802,550

[45] Apr. 9, 1974

[54] CONVEYOR GRIPPING DEVICE AND CONVEYING METHOD USING SAME

[75] Inventors: Charles F. Hinrichs, Albuquerque, N. Mex.; Gale S. Roush, Bartlesville, Okla.

[73] Assignee: Phillips Petroleum Company, Bartlesville, Okla.

[22] Filed: Oct. 19, 1972

[21] Appl. No.: 299,143

[52] U.S. Cl.............. 198/179, 198/131, 214/1 BA
[51] Int. Cl............................................. B65g 19/00
[58] Field of Search.................. 198/131, 179, 180; 214/1 BA; 294/106

[56] References Cited
UNITED STATES PATENTS 2,530,412   11/1950   Wallace ............................. 198/179
3,125,369   3/1964   Copping ............................. 198/179
1,645,600   10/1927   Kohler ............................... 198/179
1,864,114   6/1932   Angerpointer ..................... 198/179

Primary Examiner—Evon C. Blunk
Assistant Examiner—Joseph E. Valenza

[57]        ABSTRACT

An apparatus is provided for engaging the projecting rim of open-top containers. This engagement apparatus is particularly adapted for use with a conveyor means to provide an apparatus and method for conveying projected rim, open-top containers. In one embodiment, the apparatus is suitable for destacking and conveying plastic bakery trays.

7 Claims, 5 Drawing Figures

CONVEYOR GRIPPING DEVICE AND CONVEYING METHOD USING SAME

BACKGROUND OF THE INVENTION

This invention relates to conveyors. In one of its aspects, it relates to gripping devices for conveyors. In another of its aspects, it relates to gripping the projecting rims of open-top containers. In still another of its aspects, it relates to automatic conveyance of projected rim open-top containers. In still another of its aspects, this invention relates to destacking of rolled rim, open-top containers. In one of its concepts, this invention relates to the gripping of a projected rim, open-top container with sufficient force to permit conveyance with automatic gripping, conveyance, and release.

In the baking industry, it is common practice to use lightweight trays of large carrying capacity but relatively low sidewalls for conveying bakery products. Recently, trays constructed of plastic material have begun to replace the openwork wire baskets previously used. Efficient handling of these trays often calls for the removal of the tray from the top of the stack to be delivered by conveyor means to another position, such as delivery to a conveyor belt or loading location. Up to now a gripper mechanism has not been available which will move both the trays of plastic construction and wire baskets. We have invented a gripper device which can be used with both plastic trays and the wire baskets and which is readily adaptable for use in conveying any other projected rim, open-top container.

It is therefore an object of this invention to provide a means for gripping a projected rim, open-top container. It is another object of this invention to provide a method for conveying projected rim, open-top containers. It is still another object of this invention to provide a conveyor system equipped with gripper devices. It is a further object of this invention to provide an apparatus and method for destacking and conveying bakery pallet trays.

Other aspects, concepts, and the objects of this invention are apparent from a study of the disclosure, the drawings and the appended claims.

SUMMARY OF THE INVENTION

According to the present invention, a conveyor gripping device is provided which comprises a housing means within which is contained a slide block and a compression member. The slide block is in the forward end of the housing when the housing is attached to a conveyor and movement of the slide block causes compression of the compression member against the rearward end of the housing. The forward end of a lever arm is attached pivotally to the lateral side of the slide block. Attached pivotally to the rearward end of the lever arm is a foot plate. The foot plate is attached to the lever arm at the rearward end of the foot plate and is so shaped that the forward end of the foot plate defines an engaging surface and a pivot point to which is attached a hooking plate. The hooking plate is pivotally attached to the foot plate near the rearward end of the hooking plate and comprises a forward end arcuate in shape and projecting beyond the rearward lower edge to form a ledge of sufficient extension to cooperate with the forward edge of the footplate to engage a container rim projection.

In one embodiment of the invention the conveyor gripping device comprises a slide block and compression member contained in a housing means as described above, having connected thereto at each lateral side of the slide block a lever arm pivoting at its forward end at this connection with the slide block. The rearward end of each of the lever arms is then connected to a pivot shaft between the lever arms. The foot plate is attached to pivot around the pivot shaft that is connected to a hooking plate with both the foot plate and hooking plate as described above.

In another embodiment of the invention the lever plate comprises a mounting cutout which acts in conjunction with protuberances on the housing and the foot plate to limit the degree of pivot of the lever arm around the slide block and to limit the degree of pivot of the foot plate around the rearward end of the lever arm, respectively.

In another embodiment of the invention a conveyor means is provided which comprises in combination a conveyor belt having attached thereto at spaced intervals conveyor gripping devices as described above.

In still another embodiment of the invention, a method for conveying rolled rim, open-top containers and wire rim containers is provided by presenting containers with rims of compatible, engagable design in position to be engaged by a conveyor gripping device as described above; moving the conveyor gripping device connected to a conveyor belt across the rim of the container so that the gripping device hooking plate moves up and over the rim of the container to engage the rim of the container with the extension ledge of the gripping device; dragging the container to the desired position by moving the conveyor belt along an essentially horizontal path; and releasing the container by upward movement of the conveyor from the horizontal path.

The details of the apparatus of this invention and the method of its operation can best be appreciated when studied in conjunction with the drawings.

DESCRIPTION OF THE DRAWINGS

In the drawings.

Referring now to the drawings, FIGS. 1 and 2 show a preferred embodiment of the gripping device. The gripping device is attached to the conveyor chain 1 by lugs 2 and holts 3 to the slide block housing 4. In the housing is the slide block 5 and a compression member 6, here shown as a spring. Spring 6 is biased between the rear of slide block housing 4 and slide block 5. Extending vertically downward from the forward end of slide block housing 4 is force arm 33 having at its forward lower end rollers 34.

Figure 1:
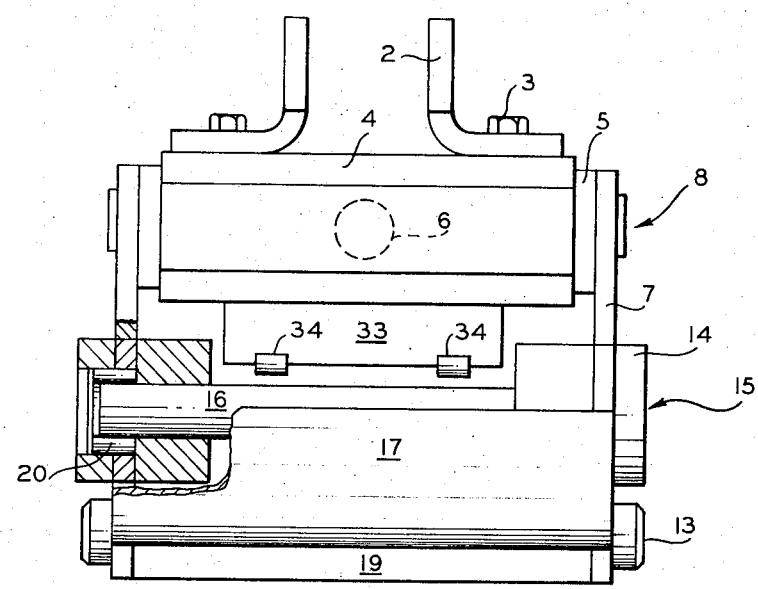
FIG. 1 shows a front view, with cutaway, of the gripping device.

At each lateral side of the housing 4 is a lever arm 7 which is attached to the slide block 5 at 8 and pivotally attached to the foot plate at 9. The lever arm contains mounting cutouts 10 which allows the forward and backward movement of slide block housing 4 and 11 which limits movement of lever arm 7 around pivot point 9. Mounting cutout 10 in conjunction with projection 12, mounted on the housing and here shown as a shoulder bolt, limits the movement of slide block housing 4. Mounting cutout 11 in conjunction with projection 13, here also shown as a shoulder bolt, limits the movement of foot plate 14 around pivot 9. A pivot pin 9 passes between the lever arms 7 and provides the pivot point for foot plate 14.

Foot plate 14 extends forward from lever arm 7 to provide a pivot point 15 within which is inserted a bearing shaft 16 which permits the free pivoting of hooking plate 17. At its lower forward end 18 the foot plate provides a surface which can have a resilient material 19 attached thereto which cooperates to engage a container rim projection.

The hooking plate 17 pivots freely around the bearing 20. It has an arcuate forward end 21 and the rearward lower edge 22 forms a ledge that extends sufficiently to the rear to cooperate with the forward end 19 of the foot plate to engage a container rim projection. Hooking plate 17 is biased in its normal upward position shown in FIG. 2 by spring 30 attached by fasteners 31 on hooking plate 17 and 32 on lever arm 7.

As can be seen above, the preferred embodiment of this invention shows a gripping device built around a hooking plate that projects rearward in a ledge formation. The depth of this ledge would be adapted to the length of the projection on the container rim which it must support in the conveying operation. Similarly, the width of the hooking ledge would be adjusted to the contact area necessary for providing sufficient contact to move the container. For best results, of course, a gripping device would be designed in view of a container or containers with specific rim design. Containers with cutout portions beneath a solid rim, i.e., variations of the well known wire rim baskets, or containers with projected rims are contemplated as being well adapted to be gripped by this device.

The resilient material attached at the engaging surface of the foot plate can be any material that is resilient but sturdy, such as natural rubber, neoprene, rubbery plastics, and the like. This resilient material serves as a buffer between the container rim and the leading edge of the foot plate.

Figure 2:
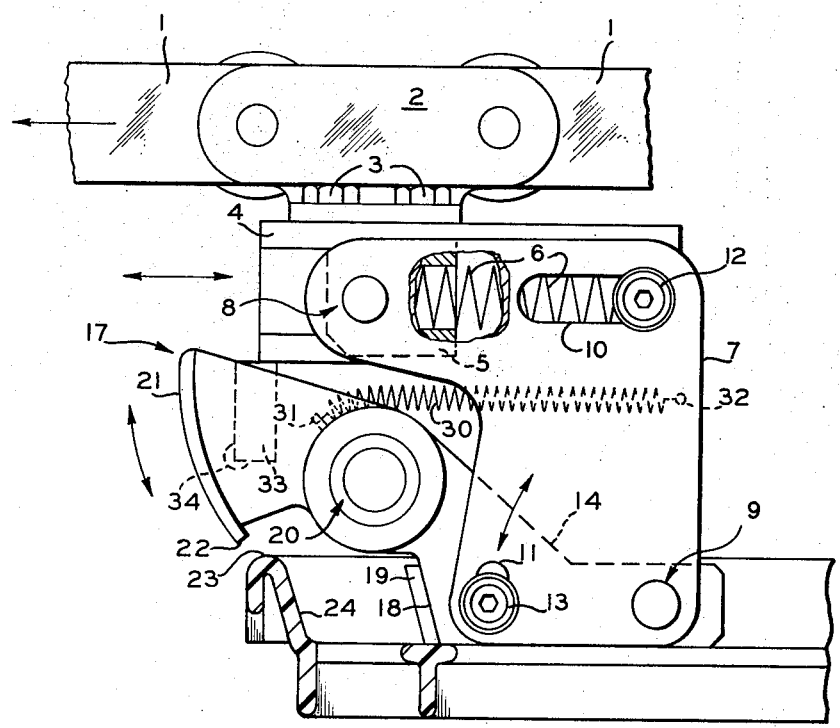
FIG. 2 shows in side view the gripping device attached to a conveyor belt approaching the edge of a tray.

In considering the operation of a conveyor equipped with gripping devices as described above spaced along a conveyor belt, refer now to FIGS. 2–5 of the drawing. In FIG. 2, the gripping device attached to a conveyor chain 1 is shown approaching the rolled rim 23 of a stacked, plastic bread tray. The tray can be held in position for engagement as by a spring-loaded holder which elevates the next tray into position as the previous one is removed. As the gripping device moves against the rim of the tray 23, the forward end 18 of foot plate 14 engages the inside face 24 of rim 23. The force of meeting the rim causes foot plate 14 to pivot around pivot shaft 9 moving as far as projection 13 and mounting cutout 11 will allow. The force also causes slide block housing 4 to move forward against compression member 6. This forward movement moves the roller 34 of force arm 33 against hooking plate 17 forcing it to pivot around bearing 20.

Figures 3, 4:
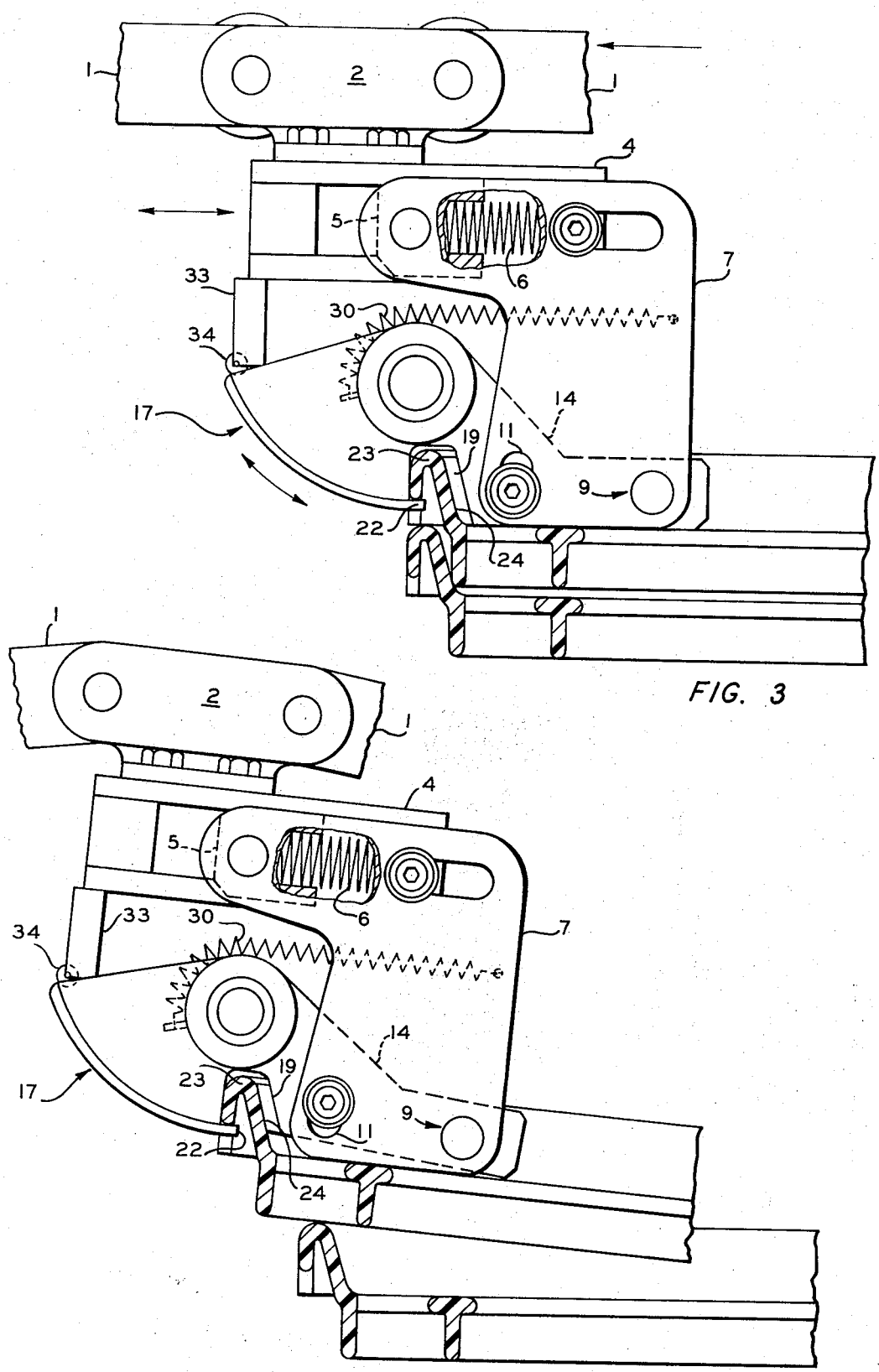
FIG. 3 shows engagement of the tray from a stack by the gripping device.
FIG. 4 shows the tray being dragged away.

In FIG. 3, the hooking plate 17 has slid over the rim of the tray 23 and the ledge extension 22 has hooked in supporting position beneath the projection of the tray rim. The engaging surface 19 of foot plate 14 has abutted the inside face 24 of the tray rim 23. The compression of compression member 6 of the slide block housing 4 has interrupted the forward travel of the gripping device sufficiently to cause the engagement action.

In FIG. 4, the gripper is shown in engagement with the tray rim projection 23 engaged between the engaging surface 19 of foot plate 14 and the supporting extension ledge 22 of hooking plate 17. The compression member 6 is still compressed by the force of slide block 5 as the forward motion of the conveyor is resisted by the tray as it is dragged along an essentially horizontal path to another position. The roller 34 of force arm 33 maintains the hooking plate 17 in the down position because the slide block housing 4 is held forward in the mounting cutouts of the lever arm 7.

Figure 5:
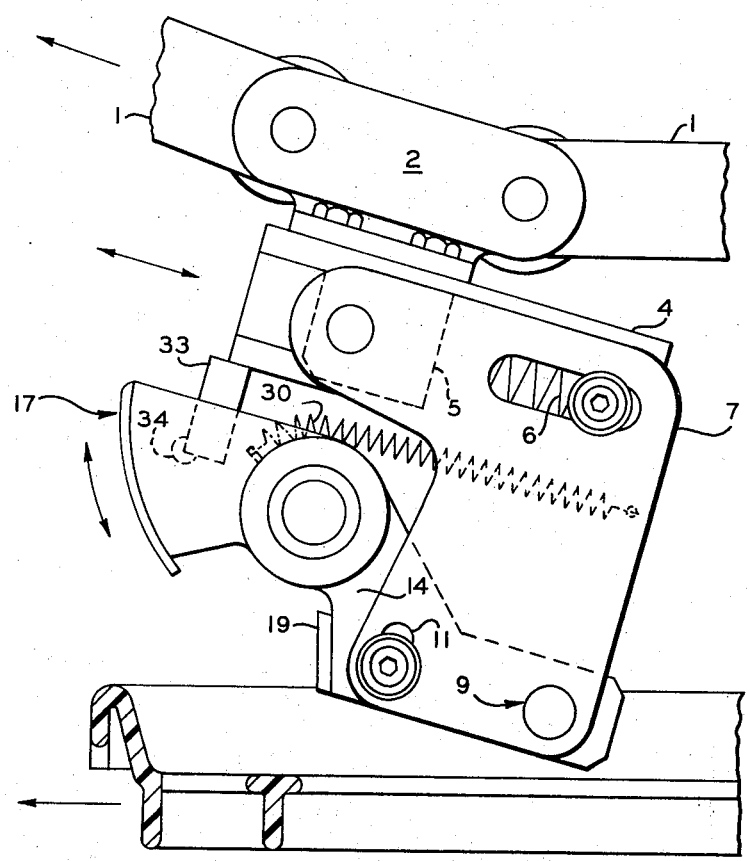
FIG. 5 shows release of the tray.

In FIG. 5, the conveyor 1 has begun an upward movement which reduced the compressing force on spring 6 causing lever arm 7 and slide block housing 4 to return to near their original positions shown in FIG. 2 and allowing hooking plate 17 to rotate upward releasing the tray.

Reasonable variation and modification are possible within the scope of the foregoing disclosure, the drawings and the appended claims to the invention, the essence of which is that there has been provided an apparatus and method for gripping a container rim porjection to move the container by conveyor to another position.

We claim:

1. A conveyor gripping device comprising: (a) a slide block housing means; (b) a slide block slidably retained within the forward end of said slide block housing means; (c) a compression member retained within the rearward end of said slide block housing means between said slide block and said rearward end of said housing means; (d) a lever arm attached to the lateral side of said slide block near the forward end of said lever arm and pivotally attached to a foot plate near the rearward end of said lever arm; (e) a foot plate pivotally attached near its rearward end to said lever arm, said foot plate comprising near its forward end a pivot point with a hooking plate attached pivotally thereto and its forward end forming an engaging surface; (f) a hooking plate pivotally attached near its rearward end to the pivot point of said foot plate, said hooking plate comprising a forward end arcuate in shape and projecting beyond the rearward lower edge to form a ledge of sufficient extension to cooperate with the forward edge of said foot plate to engage a container rim projection; (g) a force arm, terminating in at least one roller affixed thereto, extending downward from the forward end of said slide block, said force arm of sufficient length for forward motion of said force arm to engage the arcuate forward end of said hooking plate causing downward motion of said arcuate end; and (h) a spring attached to said hooking plate and said lever arm biasing said hooking plate to move said arcuate end in an upward motion.

2. The conveyor gripping device of claim 1 wherein a pair of lever arms are pivotally attached one arm to each of the lateral sides of said slide block, said lever arms having a pivot shaft attached to both lever arms near the rearward end of said lever arms; a pivot shaft attached between the rearward ends of said lever arms; and a foot plate pivotally attached near its rearward end around said pivot shaft.

3. The conveyor gripping device of claim 1 wherein said foot plate has attached thereto a resilient material at the engaging surface.

4. The conveyor gripping device of claim 2 wherein each of said lever plates comprises a mounting cutout which acts in conjunction with a projection on said housing to limit the degree of movement of said lever along the slide block.

5. The conveyor gripping device of claim 2 wherein each of said lever plates comprises a mounting cutout which acts in conjunction with a projection on said foot plate to limit the degree of pivot of the foot plate around said lever arm.

6. A conveyor means comprising in combination a conveyor belt having attached thereto at least one conveyor gripping device of claim 1, said gripping device attached at the slide block housing to extend from said belt in a gripping position wherein said force arm extends vertically downward from the forward end of the slide block housing.

7. A method for conveying an open-top container comprising: (a) presenting a container with a rim of engagable design in position for said rim to be engaged by a conveyor means of claim 6; (b) moving said gripping device in an essentially horizontal path across the rim of said container so that said hooking plate moves up and over the rim of said container engaging said rim; (c) moving said gripping device along an essentially horizontal path thereby dragging said container to a removed position; and (d) moving said gripping device in an upward path thereby releasing said container.

* * * * *